United States Patent [19]
Osmond et al.

[11] 3,717,605
[45] Feb. 20, 1973

[54] PROCESS FOR THE PREPARATION OF POLYMER DISPERSIONS OF UNIFORM PARTICLE SIZE

[75] Inventors: Desmond Wilfrid John Osmond, Windsor; Frederick Andrew Waite, Farnham; Derek John Walbridge, Beaconsfield, all of England

[73] Assignee: Imperial Chemical Industries Limited, London, England

[22] Filed: Jan. 15, 1971

[21] Appl. No.: 106,923

Related U.S. Application Data

[63] Continuation of Ser. No. 807,909, March 17, 1969, abandoned, which is a continuation-in-part of Ser. No. 476,148, July 30, 1965, abandoned.

[30] Foreign Application Priority Data

Aug. 4, 1964 Great Britain.....................31,599/64

[52] U.S. Cl.........260/34.2, 260/29.1 R, 260/29.2 R, 260/29.6 R, 260/29.7 R, 260/31.2 R, 260/32.6 R, 260/32.8 R, 260/33.4 R, 260/33.6 R

[51] Int. Cl.........C08f 47/20, C08g 53/18, C08j 1/46

[58] Field of Search............................260/34.2, 29.1

[56] References Cited

UNITED STATES PATENTS

| 3,317,635 | 5/1967 | Osmond et al. | 260/34.2 |
| 3,433,753 | 3/1969 | Farkas et al. | 260/34.2 |

*Primary Examiner*—Allan Lieberman
*Attorney*—Cushman, Darby & Cushman

[57] ABSTRACT

A dispersion of polymer particles in organic liquid having a narrow range of particle sizes. The dispersion is produced by polymerizing monomer in organic liquid in the presence of a preformed stabilizer. The stabilizer is made by condensing a compound A with a compound B. Compound A is solvatable by the organic liquid, has a molecular weight of 500–5,000 and has a group capable of condensation reaction. Compound B has a molecular weight of at least 250, is not solvatable in the organic liquid, has different polarity from compound A and includes a group capable of condensation reaction with compound A. The weight ratio of compound A to compound B in the stabilizer is 0.5 : 1 to 5 : 1.

5 Claims, No Drawings

PROCESS FOR THE PREPARATION OF POLYMER DISPERSIONS OF UNIFORM PARTICLE SIZE

This is a continuation of U.S. Application Ser. No. 807,909, filed Mar. 17, 1969 and now abandoned; U.S. Application Ser. No. 807,909 is a continuation-in-part of prior U.S. Application Ser. No. 476,148, filed July 30, 1965 and now abandoned.

This invention relates to dispersions of polymer in organic liquids.

It has been proposed to stabilize a dispersion of a polymer in an organic liquid in which it is insoluble by polymerizing monomer to form the insoluble polymer in the liquid in the presence in the liquid of a polymeric material which is a block or graft copolymer containing two types of polymeric component, one type being solvated by the liquid and another type of different polarity being relatively non-solvated and associated with the disperse polymer particles. As the polymerization proceeds, the monomer, which is soluble in the organic liquid, is converted to polymer which is insoluble in the organic liquid and forms disperse particles. The non-solvated polymeric component, which may conveniently be termed the "anchor" component of the stabilizer present in the liquid becomes associated with the surface of the disperse particles of non-solvated polymer and thereby provides around the particles a stabilizing layer of the solvated component. This process is described, for example, in U.S. Pat. Nos. 3,095,388; 3,264,234; 3,317,635; 3,257,340; 3,257,341; 3,261,788; and 3,382,297.

One of the objectives continuing work on preparation of polymer dispersions in organic liquids, in part described in the aforesaid patents, has been to develop reproducible processes of producing dispersions of polymer particles of predeterminable substantially uniform size by polymerizing monomer in an organic liquid which is a non-solvent for the resulting polymer and in the presence of a stabilizer for the polymer particles. In such processes the stabilizer may be added to the organic liquid as such or it may be made in situ during the course of the polymerization in the organic liquid by carrying out the polymerization in the presence of the solvated component; a part of the monomer polymerizes onto the solvated component to form the stabilizer.

An advantage of adding preformed stabilizer as such is that its composition and its concentration in the organic liquid at all stages of the reaction can be precisely controlled. In an in situ process there is only limited control over the precise composition of the stabilizer being formed and further there is the need to try to balance the rate of production of stabilizer simultaneously with the rate of production of disperse polymer. However, an overriding advantage of the in situ processes as compared with added-stabilizer processes described in the cited patents has been that a product of more uniform particle size could be obtained, the preformed stabilizer processes giving products of wide particle size range.

It now has been found that when preformed stabilizers of a particular type and made in a particular way are used, polymer dispersions of more uniform particle size can be produced.

More specifically, we have now found that the efficiency of the stabilizer, particularly in narrowing the particle size distribution of the polymer, is improved if the stabilizer is preformed, if it contains the two above-mentioned components of different polarity in a particular weight relation to each other, and if the stabilizer is made in a particular way. We have also found that when this weight relation exists, the stabilizer is highly effective even when the molecular weight of the solvated component is of an order considerably lower than that previously regarded as optimum. The ability to use solvated component of lower molecular weight is found to be important in that at the lower molecular weights, much finer dispersions can be obtained without using excessive proportions of stabilizer.

In accordance with the present invention, therefore, stabilizers suitable for use in stabilizing dispersions of particles in an organic liquid in which the particles are insoluble comprise at least one component which is solvatable by the liquid and at least one another component of different polarity which is relatively non-solvatable by the liquid, the solvatable component having a molecular weight of from 500 to 5,000, the non-solvatable component having a molecular weight of at least 250 and the total weight ratio of solvatable component to non-solvatable component being from 0.5:1 to 5:1, respectively, the stabilizer being obtained by condensation reaction between (i) a compound (A) which has a molecular weight of from 500 to 5,000 and is solvatable in the liquid and contains a group capable of condensation reaction and (ii) a compound (B) which has a molecular weight of at least 250, is of a different polarity from the compound (A), and contains a group capable of condensation reaction with the group of compound (A). Compound (A) provides the solvated component and compound (B) provides the anchor component of the stabilizer.

Preferably the weight ratio of solvated component to anchor component is from 0.5:1 to 2:1, respectively, more preferably about unity.

In a further preferred form of the invention the anchor component has a minimum molecular weight of 500.

Whilst stabilizers containing solvated components of molecular weight as low as 1,000 have previously been proposed, these have been made in such a way that the non-solvated anchor component had a molecular weight of at least an order of magnitude greater, i.e., 10,000 or more. This relationship between a large anchor component and a much smaller solvated component resulted in the desired objective of firmly associating the stabilizer with the disperse polymer particles. However, if the stabilizer is irreversibly attached to the particle surface, a disadvantage results. In stabilized dispersion polymerization, the polymer particles grow by polymerization of monomer on the surface of the particles; the new outer layers of polymer as they are laid down blanket the stabilizer on the underlying surface and further stabilizer must be made available to stabilize the new outer surface of the particles. In other words, as the disperse polymer particles grow, stabilizer is buried and wasted inside them.

This is an important factor where the dispersants are to be used in polymer dispersions for coating compositions. In this case in particular, it is highly desirable to keep to a minimum the proportion of stabilizer used since, although it is designed to be compatible with the main film-forming polymer, it can have an adverse effect on the properties of the final film.

The selected stabilizers can be more efficiently used and this more efficient usage of the new stabilizers is particularly important in the preparation of very fine particle size dispersions, e.g., those as small as 500 or 1,000 A. The weight proportion of stabilizer needed for stabilization is dependent on the surface area of the disperse material. In very fine dispersions, the surface area of the particles to be stabilized in relation to the weight of the particles is so large that, with the previous polymeric stabilizers, unacceptably large weight proportions were required to stabilize very fine dispersions. Using the selected stabilizers of this invention, the weight proportion can be reduced.

The new stabilizers may contain more than one unit of solvatable component per molecule though preferably, where the weight ratio of solvatable component to anchor component is greater than 2:1, the stabilizer should not contain more than two solvatable components per molecule. They are conveniently made in solution in an organic liquid by reacting by a condensation reaction the solvatable compound (A) containing a reactive group of one type with the compound (B) of different polarity containing one or more complementary reactive groups. In this way, there may be attached to the anchor component (derived from compound B), either one or a selected number of solvatable components, the number depending on the functionality of the compound (B) and the molar proportions reacted. Stabilizers containing on average a higher number of units of solvatable component per molecule may be made by reacting higher molar proportions of mono-functional compound (A) with compound (B) of suitably high functionality.

In order to achieve most efficient usage of stabilizer, the molecular weight of the solvated component should be selected according to the average size of the particles to be stabilized in dispersion. Where the particle size is to be very small say 500 – 100 A, the solvated component should have a molecular length of about 35 – 50 A. In a fully extended molecule, and this is desirably the condition of the solvated component in the liquid in which the stabilizer is used, this would be equivalent to a chain of about 35 – 50 covalent C—C links. This equivalence of length is not substantially altered by the occasion presence of other atoms, e.g., O in the chain. If the solvated component molecule is essentially a polymethylene chain, 35 links would give a molecular weight of about 500. However, the chain need not necessarily be a purely C—C chain, it may also contain non-carbon links.

When larger sized particles are to be stably dispersed, the molecular length of the solvated component should be increased in direct proportion to obtain most efficient results, until the solvated component reaches its maximum molecular weight of 5,000. Preferably the molecular weight of the solvated component is at least 650.

Where the stabilizer is to be made in solution by a condensation reaction in which a reactive group in the compound (A) is reacted with a complementary group in the compound (B), typical condensation reactions are those which give rise to the following links between the two compounds:

i. Ester links, especially when formed by ester-interchange or by a reaction such as carboxyl/glycidyl or hydroxyl/acid chloride or hydroxyl/acid anhydride.

ii. Ether links, especially when formed by addition reactions between alkylene oxides and hydroxyl.

iii. Amid links, especially when formed by amine/acid chloride reaction.

iv Urethane links, especially when formed by reaction of isocyanate with hydroxyl groups.

In order to avoid the possibility of cross-linking, it is preferred that at least one compound should behave substantially mono-functionally in such reactions.

When the stabilizer is to be used in dispersions in non-polar organic liquid such as aliphatic and aromatic hydrocarbons and long chain ketones and alcohols, the solvatable component should likewise be non-polar. Where the stabilizer is to be used in dispersions in polar organic liquid, such as alcohols, ketones and esters, the solvatable component should likewise be polar. A simple test of solvatability by any particular liquid is that the component per se before incorporation into the stabilizer should be completely soluble in that liquid.

Solvatable compounds (A) containing a group reactable in a condensation reaction as listed above may be made for example by condensation reactions producing a polyester or polyether. Preferably the polyester reaction is a simple one involving a monohydroxylic monocarboxylic monomer, such reactions leading to compounds (A) which are strictly monofunctional with respect to one or the other group. The most convenient monomers to use are hydroxy acids, particularly $\alpha$, $\omega$- or approximately $\alpha$, $\omega$- acids. For example, a hydroxy fatty acid such as 12-OH stearic acid may be polymerized to form a non-polar compound (A) solvatable by such non-polar organic liquids as aliphatic and aromatic hydrocarbons and long chain ketones. Similarly a hydroxy acid such as lactic or glycollic acid may be polymerized to form a polar compound (A) solvatable by esters and short-chain ketones. Some naturally occurring compounds also contain solvatable components useful in the stabilizers of this invention. For example, non-polar long chain polyesters of hydroxy fatty acids are found in some natural waxes such as carnauba.

Somewhat more complex, but still useful, polyesters may be made by reacting diacids with diols. For example, 1,12-decane diol may be reacted with sebacic acid or its diacid chloride to form a compound (A) solvatable by aliphatic hydrocarbons, or neo-pentyl glycol may be reacted with sebacic or adipic acid to form a compound (A) solvatable by aromatic hydrocarbons or fatty esters. Such polyesters are of a more random constitution than the simple ones referred to above and are usually more polar because of their higher ester content. Other polyesters are the polycarbonates which may be made, for example, by reacting phosgene with a mixture of difunctional and mono-functional alcohols to produce a compound (A) solvatable by ketones and aromatic hydrocarbons and having a terminal chloroformate group which can be reacted with a complementary hydroxyl or amine group in a condensation reaction.

Even more complex esters are exemplified by non-drying oil-modified alkyd resins, these being useful because of their non-polar characteristic imparted by the modifying oil which makes them solvatable by common and cheap liquid hydrocarbons. These may be made by reacting a polyol such as glycerol or pentaerythritol with a polybasic acid such as phthalic, sebacic or adipic acid and a non-drying oil or long chain fatty acid derived therefrom. The polyester is reacted to an acid value of about 5 to 30 and a stabilizer may be produced therefrom by, for example, then reacting it with an epoxy resin in the proportion of one mole of resin to each estimated carboxyl group in the polyester. These more complex esters can be polyfunctional in such reactions and so the resulting stabilizer can have more than one anchor component attached to the solvatable component.

Polyethers containing a reaction group may also be made by a variety of condensation reactions. For example, propylene oxide may be condensed to form a compound (A) containing a hydroxyl group and solvatable by ketones and esters and ethylene oxide may be condensed to form a similar compound (A) solvatable by highly polar liquids such such as alcohols.

Solvatable components of suitable molecular weight may also be made by condensation or addition reactions involving a telomer which not only controls the molecular weight of the polymer but also provides the reactive group used in the subsequent condensation reaction. For example, suitably short non-polar polymeric chains of monomers such as lauryl or stearyl methacrylate or octadecene may be made in this way by polymerization in chlorinated hydrocarbon followed by hydrolysis to produce terminal reactive groups. Polar polymer chains may be made using methyl methacrylate or vinyl pyrrolidone in similar manner.

Ionic polymerization reactions may also be used to form the compound (A). For example, non-polar hydrocarbon polymers can be formed in this way, and the reactive group therein may be provided by termination using carbon dioxide which provides a carboxyl group, or water or oxygen, which produce a hydroxyl group.

The anchor component of the stabilizer must be of different polarity to the solvatable component so that it is relatively non-solvated by the liquid phase of the dispersion. A simple test of non-solvatability by any particular liquid in which the stabilizer is to be used is that the compound (B) per se before incorporation into the stabilizer should be insoluble in the liquid, though, of course, it will be readily understood that the stabilizer as a whole should not be completely insoluble in the liquid in which it is to be used.

Where the stabilizer contains only one or a few units of solvatable components per molecule then in order to meet the weight ratio requirements the anchor component is also of relatively low molecular weight and so compound (B) may be produced by methods similar to those outlined above for the solvatable compound (A), the main differences being that it must be of different polarity to that of the solvatable compound (A) and must contain a complementary reactive group. For example, the compounds described above as being solvatable by polar liquids such as ketones, esters and alcohols, will generally be relatively non-solvated by non-polar liquids such as aliphatic hydrocarbons and so can be used as anchor components in stabilizers for use in such liquids, and vice versa.

In addition, useful anchor components which are relatively non-solvated by liquids ranging from aliphatic hydrocarbons to esters are provided by epoxy resins such as those made by condensing epichlorhydrin with diphenylol propane.

Where the stabilizer contains many units of solvatable component per molecule then the anchor component must be of correspondingly higher molecular weight and preferably an addition polymer. Such stabilizers may be made by a condensation method in which compound (A) containing one type of reactive group is reacted with an addition polymer containing per molecular the appropriate number of complementary reactive groups. These reactive groups may be introduced into the addition polymer by random copolymerization of the main monomer with a minor proportion of a co-monomer containing the reactive group.

Where the backbone of the stabilizer is an addition polymer then, for example, polymer based on methyl methacrylate as the main monomer would be suitable in an aliphatic hydrocarbon liquid, a polymer based on acrylonitrile as the main monomer would be suitable in an aromatic hydrocarbon liquid and a polymer based on styrene as the main monomer would be suitable in a polar organic liquid.

These three polymers are merely illustrative of a range extending from polar to non-polar polymer. Other typical polymers include polymers of acrylic and methacrylic acids, esters, nitriles and amides of such acids, vinyl alcohol and derivatives such as chloride, acetate, chloracetate and stearate, vinylidene chloride, styrene and derivatives such as vinyl toluene, α-methyl styrene and divinyl benzene, butadiene and others. In order to introduce reactive groups the polymer may be the product of a mixture of monomers, for example, methyl methacrylate with a minor proportion of methacrylic acid or glycidyl methacrylate, or styrene with a minor proportion of allyl alcohol or allyl glycidyl ether.

Broadly there are three types of systems, (1) where the polymer is non-solvated because it is polar relative to the organic liquid, (2) where the polymer is non-solvated because it is non-polar relative to the organic liquid, (3) where the polymer is non-solvated by all common organic liquids because of its molecular structure and irrespective of any question of relative polarity.

Systems typical of the first case are those in which the organic liquid is of a non-polar nature, the most common liquids of this type being aliphatic hydrocarbons, such as white spirit (an aliphatic/aromatic hydrocarbon), and iso-octane. With slightly more polar organic liquids, such as aromatic hydrocarbons, fatty esters and fatty ketones, very highly polar polymers may be used. The organic liquid may, of course, be a mixture.

Suitable polar polymers for use in systems of the first type include as the main monomer esters of unsaturated acids with lower alcohol, e.g., acrylic, methacrylic and ethacrylic acid esters of methyl, ethyl and butyl alcohol. In homopolymers of such esters, butyl alcohol would be the highest alcohol which can be used but this ester can be used as a co-monomer with a more polar monomer. This will usually be the case where the stabilizer is made by a condensation reaction since, as described above, the anchor polymer must then contain reactive groups provided by a minor co-monomer and these are usually more polar in nature. Higher alcohols, e.g., octyl and lauryl, can be used provided the polymers also contain an additional polar group to compensate for the longer non-polar carbon-carbon chains. For example, the esters may be copolymerized with a minor proportion of a highly polar monomer such as acrylic or methacrylic acid. Mono-esters of glycols having a free hydroxyl group may be used, the hydroxyl group providing an additional polar effect. These carboxyl and hydroxyl groups may be used to link the side chains to the preformed anchor polymer by the condensation reaction.

A further alternative is to have present in the alcohol an amino group as, for example, in methanolamines and ethanolamines, an oxane ring as in glycidyl compounds, or a free carboxylic group as in a hydroxy acid such as citric acid.

A similar type of polar polymer is produced from, as main monomer, a monomeric ester or ether of an unsaturated lower alcohol such as vinyl alcohol.

The esters may be of hydrofluoric acid and lower acids such as acetic, chloracetic, propionic and formic. Where higher acids are used then they should in any case also contain an additional polar group to produce a sufficiently polar polymer, for example, the acid may be a dicarboxylic acid, such as oxalic, in which the second carboxylic group is left free. Alternatively, the acid may contain a hydroxyl group, e.g., lactic or citric acid, the hydroxyl group being left free. Or the acid may contain an amino group, e.g., glycollic acid may be used, the amino group providing the additional polarity required.

Similar principles are applicable where the main monomer is an ether of unsaturated lower alcohols. The ether may be a simple ether of a lower alcohol such as methyl or ethyl alcohol. Reactivity may be introduced by using a reactive co-monomer or alternatively, by using an ether of a di- or tri-hydroxy alcohol of which a hydroxyl group is left free. Alternatively, the ether may be of a dimethyl ethanolamine or diethyl ethanolamine or of a glycidyl compound.

Another type of polar polymer is produced by polymerizing an acid, such as acrylic or methacrylic. Alternatively, polar derivatives such as acid chlorides, amides, methylolamides, may be polymerized. Such monomers give particularly non-solvatable polymers and are suitable for co-polymerizing with monomers which, by themselves, would not produce a satisfactorily non-solvatable polymer.

In the second type of system, the organic liquid of the dispersion is polar, e.g., methanol, ethanol, acetone, glycol, and in extreme cases, dimethyl formamide and methyl formate. Such polar organic liquids may contain a minor proportion of water. In this type of system the non-solvated polymer is relatively non-polar.

Polymers of main monomers such as styrene, vinyl toluene, divinyl benzene, diisopropenyl benzene, isoprene, butadiene, isobutylene and ethylene, are suitably non-polar.

Other non-polar polymers are those in which the main monomers are higher fatty esters of unsaturated acids such as acrylic, methacrylic and ethacrylic acids. In these cases, the alcohol component of the ester contains a long carbon-carbon chain to produce a polymer of suitable non-polarity. Cetyl alcohol is a typical alcohol. Lauryl alcohol is about the lowest alcohol which can be used in homopolymer esters and preferably esters of this alcohol are used as co-monomers with more non-polar monomer. In addition, one can use partial long-chain esters of a polyol, e.g., glyceryl distearate, dilaurate or dibehenate, the remaining hydroxyl of the glycerol being esterified with the unsaturated acid.

Alternatively, one can use as main monomers in this second type of system higher fatty esters or ethers of unsaturated alcohols such as vinyl and allyl alcohol. Suitable acid components of such esters are stearic acid, behenic acid and mono-esters of dibasic acids such as cetyl or lauryl adipate or sebacate.

Suitable ethers are those of cetyl alcohol or of glycerol distearate, dilaurate or dibehenate.

In general, in this second type of system the polymer is non-solvated by reason of it containing long carbon-carbon chains.

In the third type of system, the organic liquid may be of any polarity, e.g., aliphatic hydrocarbon, benzene or ethyl acetate. In this case, the polymer is non-solvated irrespective of its relative polarity. Such polymers include, for example, those of vinyl chloride, vinylidene chloride and acrylonitrile.

Again in these second and third types of components any necessary reactive groups can be introduced by using a minor proportion of a co-monomer containing such a group.

Where the stabilizer is to be used for stabilizing dispersions of polymer particles for use in coating composition the polymer backbone of the stabilizer should be compatible in the final coating film with the originally dispersed polymer. To achieve this it is preferred that the backbone and the disperse polymer be derived from the same or similar monomers. In any case, the principles laid down above for relating backbone polymer to liquid may also be applied to disperse polymer.

Stabilizers of this invention are particularly useful in dispersion polymerizations in which ethylenically unsaturated monomer is polymerized in an organic liquid also containing therein an appropriate stabilizer of the type described above. However, the new stabilizers may also be used in dispersions of other types of particles, e.g., pigments, metallic powders, pesticides, blowing agents, etc.

As an illustration of the invention, a low molecular weight solvatable component may be derived say from long chain fatty acids, these materials being solvated by non-polar liquids. For example, 12-OH stearic acid is a suitable starting material. This has a molecular weight of about 284, so that the dimer has a molecular weight of about 550, i.e., at the lower end of the selected range. The dimer has a residual carboxyl group and so this can be reacted with say a glycidyl group in compound (B), which may be, say, an epoxy resin of molecular weight about 1,000.

The 12-OH stearic acid may, of course, be polymerized to a higher degree to produce, e.g., trimer of molecular weight about 840, tetramer of molecular weight about 1,120, and so on. 1 or 2 units of trimer may, for example, be combined with an epoxy resin of molecular weight about 1,500. It will be appreciated that when using monomer units of the size of long chain fatty acids in the preparation of the stabilizing component, the degree of polymerization has a very marked effect on molecular weight of the solvated component and consequently on its stabilizing properties.

The invention is further illustrated by the following Examples in which parts are by weight.

EXAMPLE 1

860 parts of trimer of 12-OH stearic acid having a molecular weight of about 860 were reacted with 1,500 parts of an epoxy resin of molecular weight about 1,500 by refluxing in solution in a mixture of aliphatic hydrocarbon and butyl acetate.

This stabilizer was used in a dispersion polymerization as follows:

A mixture of 600 parts low boiling petroleum 60° – 80° C., 300 parts white spirit, 2 parts azodiisobutyronitrile initiator and 6 parts of a 10 percent solution of primary octyl mercaptan in white spirit was heated to reflux and to it was added over a period of 3 hours a mixture of 25 parts of the stabilizer prepared as described above, 980 parts of methyl methacrylate, 20 parts of methacrylic acid, 2 parts of azodiisobutyronitrile initiator and 20 parts of a 10 percent solution of primary octyl mercaptan in white spirit. The product was a very fine stable dispersion of polymer containing about 50 percent solids. In this dispersion the trimeric acid component of the stabilizer, being non-polar, was solvated by the substantially non-polar liquid hydrocarbon and the epoxy resin component, being of different polarity was relatively non-solvated and was associated with the disperse particles of like polar polymer.

EXAMPLE 2

750 parts of poly-12-hydroxystearic acid having a molecular weight of 1,500 were reacted with 700 parts of an epoxy resin of molecular weight 1,400 by refluxing in a mixture of xylene β-ethoxyethyl acetate in the present of 15 parts of N,N′-dimethyl dodecylamine until the acid value of the solution reaches a low and constant figure. This product could be used as an effective stabilizer of polymer particles dispersed in substantially aliphatic hydrocarbon as follows:

A mixture of 375 parts of low boiling petroleum 60° – 80°C., 45 parts of an aliphatic/aromatic hydrocarbon boiling in the range 155° – 195°C., 22 parts of methyl methacrylate, 1 part of azodiisobutyronitrile and 25 parts of the polymeric dispersant as described above was refluxed for 20 minutes. To this refluxing mixture was then added during 3½ hours a mixture of 478 parts of methyl methacrylate, 1 part of azodiisobutyronitrile and 10 parts of a 10 percent solution of octyl mercaptan in the aliphatic/aromatic hydrocarbon (boiling range 155° – 195°C.). The mixture was maintained at reflux for 15 minutes more. The mixture was maintained at reflux for 15 minutes more. The resulting product was a fine stable dispersion containing about 50 percent solids, the particle size being 0.1μ; this was achieved using only 2.5 percent of dispersant in the dispersion.

The epoxy resin used above is a commercial resin made by condensing diphenylol propane with epichlorhydrin.

Similar stabilizers were prepared by condensing the polyester of the first column below with the epoxy resin in the second column in equimolecular amounts:

| Molecular weight of polyester | Molecular weight of epoxy resin |
|---|---|
| 1500 | 1000 |
| 1000 | 1000 |
| 1000 | 1400 |
| 700 | 1000 |
| 700 | 1500 |

The polyester was a polymer of 12-OH stearic acid chain-stopped with stearic acid and contained a terminal carboxyl group reactable with an epoxy group in the resin. These stabilizers can be used in dispersion polymerization in non-polar liquids of the type described above; the polyester is non-polar and is solvated by the organic liquid whereas the epoxy resin of different polarity is not.

EXAMPLE 3

The following ingredients were charged to a heated reactor equipped with reflux condenser with water separating device, stirrer, thermometer and sampling line.

| | |
|---|---|
| Adipic acid | 292 parts |
| Glycerol | 190 parts |
| Pure stearic acid | 508 parts |
| Xylol | 70 parts |

This mixture was refluxed and water of reaction removed over approximately 20 hours. At the end of this time 93 parts of water had been removed and the acid number of the resinous polyester was approximately 25.

140 parts of a commercially available epoxide resin having a molecular weight of approximately 1,400 were dissolved in 640 parts of β-ethoxyethyl acetate and to this solution were added 170 parts of the product of the above reaction. 2 parts of N,N′-dimethyl dodecyl amine were also added and the whole refluxed in a reactor as described above. Samples were drawn at intervals and the acid number of the solution fell over a period of approximately 10 hours from 11 to 0.7. The product was a solution containing approximately 35 percent of a material, suitable for use as a stabilizer in non-polar liquids, the polyester component being solvatable by such liquids and the epoxide resin component not being solvatable.

The above product and the original polyester were both evaluated as stabilizers as follows:

To 700 parts of a petroleum fraction (boiling at approximately 80°C.) were added 330 parts of methyl methacrylate, 16.5 parts of the polyester prepared as described above, 50 parts of β-ethoxyethyl acetate, 0.5 part of primary octyl mercaptan, and 1 part of α,α-azodiisobutyronitrile. The whole was refluxed in an apparatus equipped with a stream heating jacket, condenser, thermometer, stirrer, etc. An extremely coarse dispersion which immediately flocculated and coagulated in granular masses on the stirrer and walls of the reactor was formed very slowly. A sample of the substantially clear liquor was analyzed and the results indicated that substantially the whole of the polyester had remained in solution and had not become associated with the precipitated polymer.

This experiment was repeated using the stabilizer, i.e., polyester/epoxide resin.

83 parts of the 35 percent stabilizer solution were dissolved in 330 parts of methyl methacrylate, together with 0.5 part of primary octyl mercaptan and 1 part of $\alpha,\alpha$-azodiisobutyronitrile. This mixture was added to 700 parts of the same petroleum fraction as used above in the same apparatus and the whole refluxed at approximately 80°C. After a short induction period an excellent fine particle size stable polymer dispersion was produced and after 2 hours at reflux a solids determination indicated that substantially complete polymerization of the methyl methacrylate had occurred.

EXAMPLE 4

1010 parts of a 30 percent solution of a copolymer of methyl methacrylate/glycidyl methacrylate copolymer (88/12 by weight; molecular weight approximately 10,000) in ester solvents was mixed with 377 parts of a 92 percent solution of poly-12-hydroxy stearic acid (molecular weight approximately 1,800) in xylene. Solvent was distilled off until the mixture refluxed at 130°C. 3.2 parts of N,N-dimethyl dodecylamine were then added and the mixture refluxed for 36 hours. The resulting stabilizer comprised on average four chains of poly(hydroxy stearic acid) per polymethacrylate backbone and was used in a dispersion polymerization as follows:

11.5 parts of this stabilizer solution were mixed with 390 parts petrol, 48 parts white spirit, 21.6 parts methyl methacrylate and 1 part of azodiisobutyronitrile. The mixture was heated to reflux and refluxing continued for 20 minutes. To the mixture, which was then a white low solids dispersion, 132 parts of octyl mercaptan were added all at once. A mixture of 238 parts methyl methacrylate, 0.36 part octyl mercaptan, 115 parts of the above stabilizer solution, and 0.50 part of azodiisobutyronitrile was added during 1½ hours, followed by a mixture of 238 parts methyl methacrylate, 0.36 part octyl mercaptan and 0.50 part azodiisobutyronitrile in the next 1½ hours. Reflux was continued for one-half hour. The resulting dispersion contained 54 percent of fine particle polymer.

EXAMPLE 5

A mixture of 182 parts of a low boiling petroleum 60° – 80°C., 24 parts of a high boiling aliphatic hydrocarbon 115° – 195°C., 10 parts of the first stabilizer described in Example 2, 40.5 parts of vinyl acetate and 2.84 parts of azodiisobutyronitrile was refluxed for 35 minutes. To this refluxing mixture was then added during 3 hours a mixture of 207 parts vinyl acetate and 7 parts of azodiisobutyronitrile. Refluxing was continued for 30 minutes more. The product was a high solids, fine particle, stable dispersion of polyvinyl acetate in aliphatic hydrocarbon.

EXAMPLE 6

110 parts of poly(12-hydroxy stearic acid) of molecular weight 1,100 were treated with 20 parts of thionyl chloride in 200 parts of pyridine at room temperature and the mixture refluxed until the evolution of hydrogen chloride ceased. After removing excess thionyl chloride by distillation there were added 35 parts of polyester of molecular weight approximately 700, prepared by reacting 450 parts of phthalic anhydride with 250 parts of ethylene glycol. The mixture is reheated to reflux until the evolution of hydrogen chloride ceases. The cooled mixture is diluted with water and the organic layer collected, washed well with water and dried. This product which consisted of a phthalate polyester component having two poly(hydroxy stearic acid) components attached thereto, could be used as an effective stabilizer of polymer particles dispersed in substantially aliphatic hydrocarbon as described in Example 3.

EXAMPLE 7

A mixture of 170 parts of styrene, 30 parts of acrylic acid and 10 parts of azodiisobutyronitrile was added during 3 hours to a refluxing mixture of 14 parts primary octyl mercaptan and 400 parts xylene. Refluxing was continued for 2 hours more to produce a copolymer of molecular weight about 4,000. 300 parts of methoxy terminated polyethylene glycol (molecular weight approximately 750) was added and xylene/water was distilled off until water ceased to azeotrope. The mixture was then adjusted to 50 percent solids by addition of xylene. The stabilizer so produced was used as follows in a dispersion polymerization of a relatively non-polar monomer in a polar organic liquid which solvated only the polyethylene glycol component.

A mixture was 100 parts of styrene, 10 parts of the above stabilizer solution, 200 parts of ethanol and 0.5 part of azodiisobutyronitrile was refluxed for 2 hours. The product was a fairly fine particle size dispersion of polystyrene in ethanol.

EXAMPLE 8

A telomer (molecular weight approximately 600) prepared by polymerizing styrene with benzoyl peroxide in the presence of carbon tetrachloride was hydrolyzed with alcoholic potassium hydroxide. The free acid was generated by treatment with mineral acid and reacted with an epoxy resin (molecular weight approximately 700). The stabilizer may be used in aromatic hydrocarbon liquids which solvate the styrene telomer chains.

We claim

1. A process for producing a dispersion of polymer particles in a dispersing liquid in which the polymer is insoluble which comprises polymerizing at least one ethylenicallyunsaturated monomer in said dispersing liquid in the presence in said dispersing liquid of a preformed dispersion stabilizer, said dispersion stabilizer being the product of condensation reaction between at least one compound (A) which has a molecular weight of from 500 to 5,000 and is solvatable by said dispersing liquid and contains a group capable of condensation reaction with a compound (B) which has a molecular weight of at least 250 and is of different polarity from the solvatable group and relatively non-solvatable in said organic liquid, and contains a group capable of condensation reaction with compound (A), the total weight ratio of compound (A) to compound (B) in said stabilizer being from 0.5 : 1 to 5 : 1.

2. A process as claimed in claim 1 in which the weight ratio of compound (A) to compound (B) is from 0.5 : 1 to 2 : 1.

3. A process as claimed in claim 1 in which the weight ratio of compound (A) to compound (B) is about unity.

4. A process as claimed in claim 1 in which compound (B) has a molecular weight of at least 500.

5. A process as claimed in claim 1 in which said stabilizer contains, per molecule, not more than two molecules of said compound (A) and in which the weight ratio of compound (A) to compound (B) is greater than 2 : 1.

* * * * *